US005603059A

United States Patent [19]

Churchill et al.

[11] Patent Number: 5,603,059

[45] Date of Patent: Feb. 11, 1997

[54] SOFTWARE ARCHITECTURE SYSTEM HAVING A VIRTUAL I/O CHANNEL INCLUDING MULTI-LAYERED COMMUNICATION INTERFACE IN BETWEEN VIRTUAL STATIONS AND PHYSICAL MODULES

[75] Inventors: Steven J. Churchill, Danbury; Edward P. Daniels, Jr., Trumbull; Raymond J. Kerney, Brookfield, all of Conn.

[73] Assignee: Pitney Bowes Inc., Stamford, Conn.

[21] Appl. No.: 232,542

[22] Filed: Apr. 22, 1994

[51] Int. Cl.[6] .............................. G06F 13/00; G06F 13/14

[52] U.S. Cl. .......................... 395/856; 395/858; 395/376; 395/406

[58] Field of Search .................................... 395/825, 838, 395/849, 831, 856, 858, 725, 775, 406, 418; 370/94.1, 110.1

[56] References Cited

U.S. PATENT DOCUMENTS

| | | | |
|---|---|---|---|
| 4,306,803 | 12/1981 | Donohue et al. | 355/14 |
| 4,547,856 | 10/1985 | Piotroski et al. | 364/478 |
| 4,649,501 | 3/1987 | Bloom et al. | 364/519 |
| 4,680,753 | 7/1987 | Fulton et al. | 370/85 |
| 4,847,775 | 7/1989 | Roch et al. | 364/469 |
| 4,858,117 | 8/1989 | DiChiara et al. | 395/418 |
| 4,910,658 | 3/1990 | Dudash et al. | 364/131 |
| 4,942,535 | 7/1990 | Francisco | 364/478 |
| 4,962,623 | 10/1990 | Francisco | 53/54 |
| 4,970,654 | 11/1990 | Francisco | 364/478 |
| 5,003,485 | 3/1991 | Francisco | 364/478 |
| 5,127,012 | 6/1992 | Hiliger | 355/206 |
| 5,157,667 | 10/1992 | Carusone, Jr. et al. | 371/129.1 |
| 5,159,594 | 10/1992 | Bales et al. | 390/110.1 |
| 5,247,520 | 9/1993 | Geise et al. | 370/94.1 |
| 5,448,490 | 9/1995 | Gottlieb et al. | 364/478 |

*Primary Examiner*—Thomas C. Lee
*Assistant Examiner*—Le Hien Luu
*Attorney, Agent, or Firm*—Charles R. Malandra, Jr.; Melvin J. Scolnick

[57] ABSTRACT

A software architecture system is provided for real-time control of an inserting system having a central processor coupled to a plurality of distributed processors that are associated with physical modules of the inserting system, wherein the central processor is coupled to the distributed processors by at least one type of physical I/O channel. The system includes real-time control routines resident in the central processor, a plurality of virtual stations resident in the central processor, wherein each of the software stations corresponding to one of the physical modules of the inserting system. The system further includes at least one virtual I/O channel corresponding to each type of the physical I/O channel, the virtual I/O channel being resident in the central processor and operatively coupled to the physical I/O channel, and a message dispatcher resident in the central processor for dispatching messages from the virtual stations to the corresponding physical modules through the virtual I/O channel. The virtual I/O channel includes a multi-layered communication interface between the physical and the virtual stations, which includes an application interface layer that is independent of the type of physical I/O channel and a physical layer that is changes according to the type of physical I/O channel.

5 Claims, 4 Drawing Sheets

WHERE:

| | |
|---|---|
| STX | START OF TEXT CHARACTER |
| DATA | FROM 0 TO 120 BYTES OF LINK ESCAPE ENCODED BINARY DATA |
| ETX | END OF TEXT CHARACTER |
| CRC1 | THE LOW ORDER BYTE OF A 16 BIT CRC CODE. (LINK ESCAPE ENCODED) |
| CRC2 | THE HI ORDER BYTE OF A 16 BIT CRC CODE. (LINK ESCAPE ENCODED) |
| SEQ | A ONE BYTE SEQUENCE CHARACTER (WRAPS BACK TO 1 AFTER 255, OR EQUAL TO 0) (LINK ESCAPE ENCODED) |
| EOM | END OF MASSAGE CHARACTER |

SOFTWARE ARCHITECTURE SYSTEM HAVING A VIRTUAL I/O CHANNEL INCLUDING MULTI-LAYERED COMMUNICATION INTERFACE IN BETWEEN VIRTUAL STATIONS AND PHYSICAL MODULES

FIELD OF THE INVENTION

The invention disclosed herein relates to document collating and envelope stuffing machines, and in particular to a modular machine of the foregoing type capable of higher speeds and increased reliability and flexibility.

BACKGROUND OF THE INVENTION

Production mailing apparatus, such as inserting machines, typically has been one of the mail handling devices least susceptible to standardization because of the disparate nature of each user's applications and the range of volumes of mail to be handled by each different customer. Each mailing application has in the past had to be customized in order to meet the customer's needs. For the manufacturer, this typically has required expensive re-engineering efforts on each machine, including the customization of the software and firmware of each machine.

Prior inserter systems, in particular console inserter systems, such as the Pitney Bowes 8300 Series inserter systems included a multibus architecture that included a Supervisory program that reflected the particular configuration of the particular inserter system. Generally, any change in configuration that includes the addition of new modules requires a recustomizing of the Supervisory software to control the inserter system. The recustomizing of the Supervisory software has a destabilizing effect because the entire inserter system must be checked out with the recustomized Supervisory software.

Heretofore, the conventional inserter multibus architecture has been a parallel data bus without diagnostic capability. The multibus architecture includes a master/slave arrangement in which a central processor having a Supervisory program for the inserter system stored therein provides address and command signals to distributed processors having programs for respective modules of the inserter system stored therein. The central processor polls the distributed processors before sending control commands and addresses and receiving responses. See, for example, U.S. Pat. No. 4,547,856, issued to Piotroski et al. On Oct. 15, 1985, and assigned to the assignee of the present invention.

The multibus architecture has worked well but has reached its limitation as inserter system requirements, such as speed, throughput and size, have increased. Furthermore, new features required of inserters today place even larger time demands for faster Supervisory processing. Since the multibus architecture is master/slave (polled) arrangement, as more modules and distributed processors are added to the inserter system, the time available for each distributed processor to respond to polling by the central processor becomes less, thus delaying the response by the distributed processor.

New physical connections, such as a global serial channel, are desired for new inserter modules being developed. However, such modules cannot be used in an inserter system dedicated to the multibus architecture.

It is an object of the present invention to provide a software architecture that is suitable for the current and future requirements for Supervisory control of inserter systems.

It is also an object of the present invention to provide a system software architecture that is compatible with past and present I/O configurations, including a combination thereof, and that is flexible to handle future I/O configurations.

It is a further object of the present invention to provide a software architecture that has diagnostic capabilities.

SUMMARY OF THE INVENTION

The present invention provides a software architecture for inserter systems that is modular, reusable and can perform diagnostics. The present invention is a message based architecture rather than a traditional call routine architecture.

In accordance with the present invention an open station architecture is used for the supervisor software of a modular inserting system that includes a distributed processing system. In the open station architecture ,the supervisor software views the inserting system as a plurality of virtual (software) stations and I/O channels that communicate through a message dispatcher. One benefit of the open station architecture of the present invention is that it provides supervisor software that does not change with changes to any of the physical modules or types of I/O channels configured in the inserter system. Another benefit is that the present invention does not have the limitations found in the conventional distributed processing software architecture. Still another benefit of the present invention is different types of physical devices, i.e. devices connected to different physical I/O channels, can communicate to each other through the open station architecture of the present invention.

In accordance with the present invention, a software architecture system is provided for real-time control of an inserting system having a central processor coupled to a plurality of distributed processors that are associated with physical modules of the inserting system, wherein the central processor is coupled to the distributed processors by at least one type of physical I/O channel. The system includes real-time control routines resident in the central processor, a plurality of virtual stations resident in the central processor, wherein each of the software stations corresponding to one of the physical modules of the inserting system. The system further includes at least one virtual I/O channel corresponding to each type of the physical I/O channel, the virtual I/O channel being resident in the central processor and operatively coupled to the physical I/O channel, and a message dispatcher resident in the central processor for dispatching messages from the virtual stations to the corresponding physical modules through the virtual I/O channel. The virtual I/O channel includes a multi-layered communication interface between the physical and the virtual stations, which includes an application interface layer that is independent of the type of physical I/O channel and a physical layer that is changes according to the type of physical I/O channel.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE PRESENT INVENTION

In describing the present invention, reference is made to the drawings, wherein there is seen the structure of a new open station architecture for software controlling an inserter system. In accordance with the present invention, Supervisor software controls various modules 70–82 that comprise the inserter system through a Message Dispatcher 30 and an I/O Channel 50.

Figure 1:
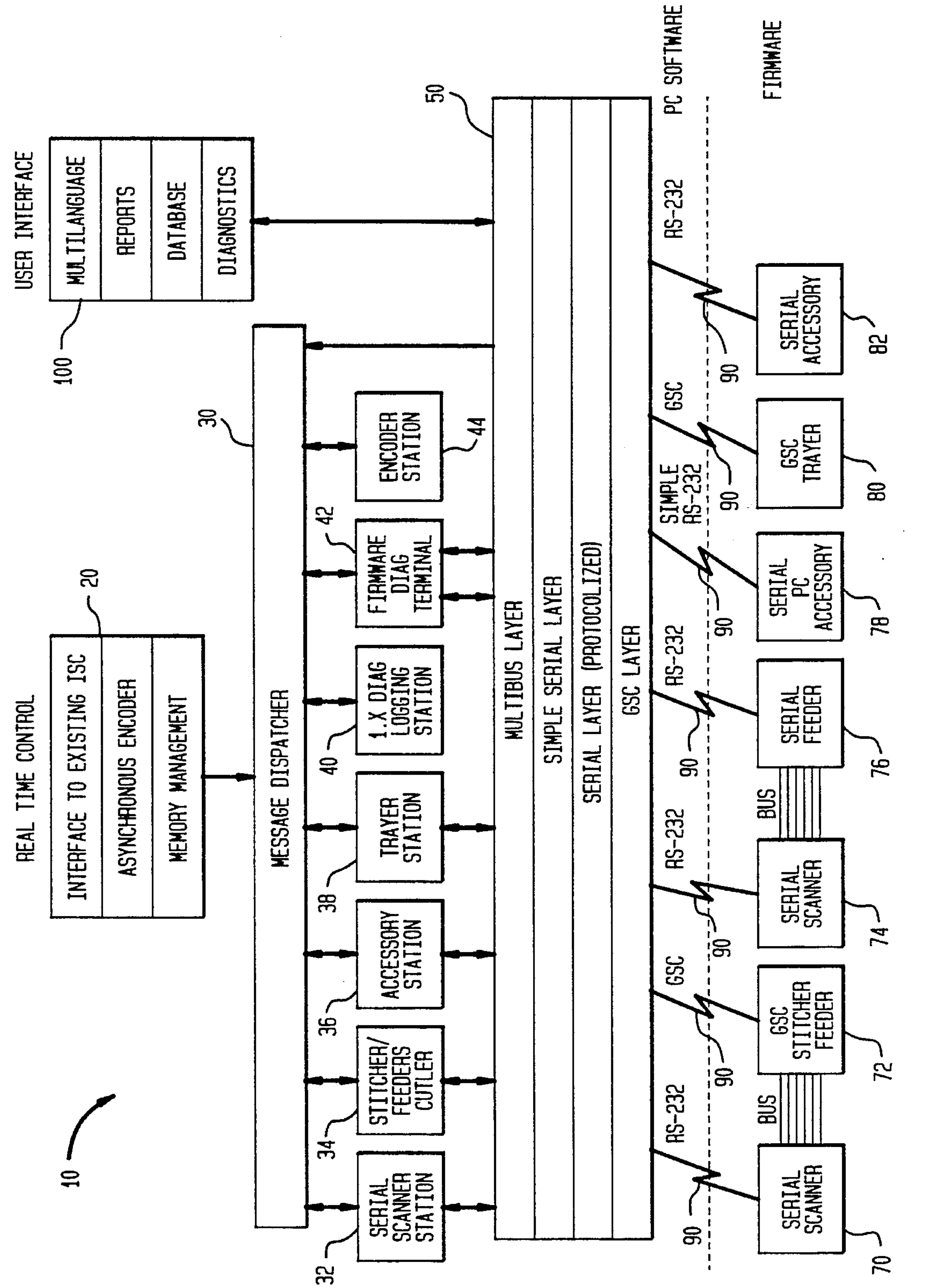
FIG. 1 is a block diagram of open station architecture for Supervisory software in a console inserter in accordance with the present invention.

In FIG. 1, the open station architecture software, generally referred to as 10, includes a real time control portion 20 that initializes the timers, interrupt handling, and performs memory management tasks as well as interfacing with an asynchronous encoder. The open station architecture also includes a Message Dispatcher 30 that controls messages between software Stations 32–44 and a software I/O Channel 50. I/O Channel 50 is an interface to physical i/o channels, generally designated 90, that are coupled to firmware associated with modules 70–82. A user interface 100 communicates with software STATIONS 32–44 and firmware modules 70–82 through I/O Channel 50. It can be seen that there is each firmware module has a corresponding software Station.

The Open Station Architecture 10 is described in detail beginning with the main components: I/O Channel 50, Message Dispatcher 30 and Stations 32–44.

I/O CHANNEL

In it's simplest form, an i/o channel is the physical path (through a wire, for example) that data travels into or out of a computer. Serial ports, parallel printer ports, network cards and many other devices are examples of physical i/o channels.

In accordance with the present invention, I/O Channel 50 is an intelligent communication server that manages and simplifies the various physical i/o channels 90. The I/O Channel 50 software routines provide the benefits of uniformity, modularity, queuing of data, diagnostics and message routing.

In the Open Station Architecture 10, programmers need only learn how to incorporate use of the I/O Channel 50 into a program once. Thereafter, regardless of the communication methodology or protocol used, the interface to I/O Channel 50 remains the same. This dramatically reduces the software development time required to perform communication intensive operations typical of machine control application.

I/O Channel 50 software is a separate software entity that is completely portable between applications. I/O Channel 50 software queues or buffers data in both directions (into the computer and out of the computer) and thereby centralizes the intelligence required to drive a physical i/o channel (handshaking, reading data from ports, writing data to a port when the port is available, etc.) Application software can be written assuming that complete, error free messages are exchanged with the I/O Channel software.

The I/O Channel software supports a wide variety of diagnostic functions, including automatic data capture and view (by means of the queues discussed above), three levels of self test and the ability to introduce or intercept communication traffic from a user friendly interface. Application software that makes use of the I/O Channel software automatically gain access to all these diagnostics, completely transparent to the application.

The I/O Channel software will route incoming traffic (by means of a Message Dispatcher, discussed below) to its intended destination, without the need for the application software to "poll" the channel for data. The I/O Channel software can even route communication traffic to two different destinations, provided the protocol implemented on the physical i/o channel supports this

MESSAGE DISPATCHER

The Message Dispatcher 30 is an intelligent message delivery system between software modules or Stations 32–44 (defined below). Stations simply fill in a message structure with the destination and source addresses (the ID of the station sending and receiving the message), a command byte, and up to 256 bytes of data. The message structure is then passed to the Message Dispatcher which buffers the message and immediately returns with status as to whether or not the message (for example, station ID valid, internal error, etc.) can be delivered. At some point in time (not necessarily immediately), the Message Dispatcher will deliver the message to its destination address. The advantages of passing information from station to station in this manner, as opposed to function calls are the benefits of queuing of data, diagnostics, and replaying messages. The Message Dispatcher 30 queues or buffers all messages sent to it for delivery to Stations 32–44. This allows the Message Dispatcher to check point processing and forward all messages to the next time slice, if the program is in danger of overrunning the current time slice. This guarantees a smoothly running system, with enough time available to process non-real time activities, such as, user interface. The present invention is asynchronous in that when the Message Dispatcher notifies a station that a message is present for the station, the station can handle the message then or flag it for later handling.

The Message Dispatcher 30 supports a wide variety of diagnostic functions, including automatic data capture and view (by means of the queues discussed above) as well as the ability to introduce or intercept message traffic from a user friendly interface.

The Message Dispatcher has the capability to record message history whereby the last "n" messages can be replayed. This will allow off-site support personnel to examine problems that heretofore typically could be not be reproduced.

STATIONS

Under an open station architecture, the strict definition of a station is a software module that:

- Owns one or more physical i/o channels 90 (and thereby communicates with the I/O Channel 50 software).
- Contains a constructor method, by which the station, such as Stations 32–44, creates itself. The constructor method is called in non-real time, and as such, any memory the station needs to perform it's functions should be allocated in the constructor.

Contains a configuration method, by which the station is supplied configuration information. The configuration method is also called in non-real time, and as such can also allocate any memory required to store configuration information.

Contains a message procedure, recognized by the Message Dispatcher, which responds to messages delivered to the station by the Message Dispatcher. The message procedure is called in real time, and cannot allocate, free or reallocate any memory.

Contains a destructor method, by which the station destroys itself. The destructor method is also called in non-real time, and as such it is responsible for freeing any memory allocated in the construction and configuration methods.

The present invention does not comply completely with the foregoing definition. In accordance with the present invention, a station that is not associated with any i/o channels, that does not require any configuration, and perhaps does not require a constructor or destructor is referred to as a pseudo-station. These types of stations only posses a message procedure capable of receiving messages from the Message Dispatcher. Examples of a pseudo-station in the present invention are logging station 40 and encoder station 44.

In the present invention, stations 32–38 include application code of the Supervisor software that controls physical devices 70–82.

COMMUNICATION INTERFACES

Figure 2:
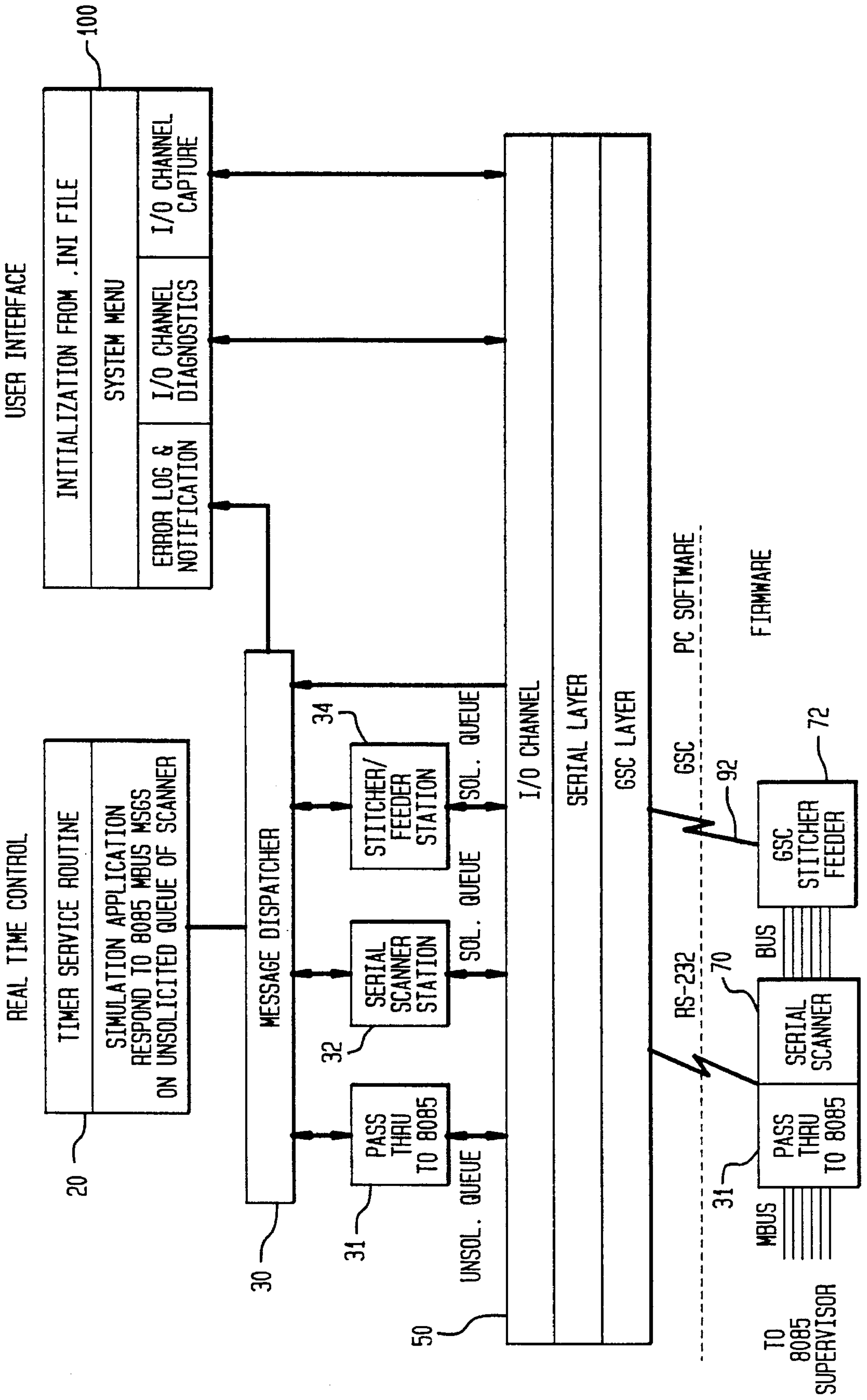
FIG. 2 is a block diagram of open station architecture for Supervisory software in a module of the console inserter.

Each physical device that exists on an inserter chassis and has need to communicate with the Supervisor software has a unique, physical i/o channel associated with it. As seen in FIGS. 1 and 2, each of modules 70–82 is associated with a serial or GSC i/o channel 90. The i/o channels 90 serve as a communication pathway between the Supervisor and the physical devices, i.e., modules 70–82, attached to the inserter chassis.

In accordance with the present invention, each of the i/o channels 90 have a common structure with a uniform interface (hereafter referred to as the Communication Interface Software), thereby reducing the complexity of software development, testing and maintenance. The Communication Interface Software is responsible for maintaining and managing the physical i/o channel 90 between the Supervisor software and each of the physical devices, i.e. modules 70–82, that together comprise the inserter. The Communication Interface Software provides all initialization and interface, buffering, scheduling, error detection and correction, and finally, the actual access methods to the communication devices.

STRUCTURE OF A COMMUNICATION INTERFACE

Figure 3:
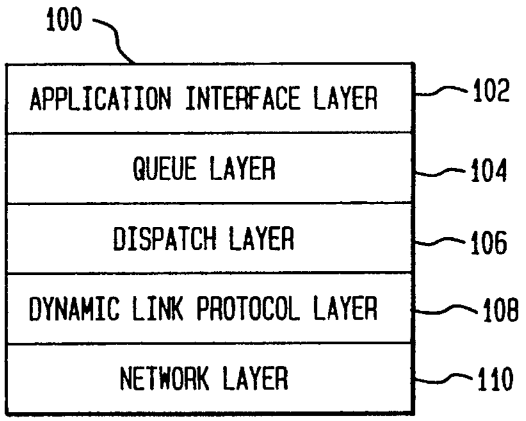
FIG. 3 is a diagram illustrating five distinct layers of communication interface.

Referring now to FIG. 3, the Communication Interface Software, generally designated 100, functionally provides a layered communication architecture consisting of five distinct layers: Application Interface 102, Queue 104, Dispatch 106, Dynamic Link Protocol 108 and Network 110.

THE APPLICATION INTERFACE LAYER

The Application Interface Layer 102 of Communication Interface Software 100 contains all of the methods by which the Supervisor software communicates and interacts with a physical i/o channel. As such, it provides the public access methods and functions for the i/o channel and passes messages back to the inserter when data is received from the i/o channel. The Application Interface Layer 102 makes all physical i/o channels look the same to the Supervisor software. The Application Interface Layer 102 supports public access methods that incorporate the following functionality:

OPEN—Initialize a physical i/o channel for operation.

READ—Read a specific or non-specific message from the i/o channel.

WRITE—Write a message to the i/o channel.

STATUS—Solicit the status of a specific message or of the i/o channel itself.

CLOSE—Shut down an i/o channel.

As far as the Supervisor is concerned, the Application Interface Layer is the physical i/o channel 90. While there will be unique communication interface code for each type of i/o channel 90 (serial, multibus, general serial channel (GSC) etc.), the interface methods will remain the same across all channel types. Therefore, the type of i/o channel 90 associated with a physical device 70–82 can be entirely software configurable and can be easily change to match the configuration of the machine.

The format of the public interface of the Application Interface Layer 102 of a communication channel is described in accompanying Appendix A.

QUEUE LAYER

The Queue Layer 104 of the Communication Interface Software 100 provides a mechanism through which application code of the Supervisor software, the physical device attached to the i/o channel and a real time interrupt service routine (ISR) communicate. The Communication Interface Software 100 for each I/O channel 50 will have three individual queues, one for messages being written by the application portion of the Supervisor, one for responses received by the physical i/o channel 90, and one for unsolicited messages received from the physical i/o channel 90. Each queue holds a finite number of messages. It is expected that only the unsolicited message queue should ever have more than one data item on it at one time, although all three queues possess this capability.

During an I/O Channel service routine (as called from a timer interrupt), if a message exists on either the unsolicited message queue or the response queue, a message is sent to the event queue for the application in order that this message can be properly retrieved. If a message exists on the application queue, it will be transmitted over the I/O channel, assuming that the I/O is not busy. Therefore, the Queue Layer 104 provides buffering for data passing back and forth between the Application Interface Layer and the lower layers of the I/O channel. The Queue Layer 104 also allows communication to proceed asynchronously, independent of the availability of either side of the i/o channel 90, makes it possible for devices to send unsolicited messages up to the application, and. alerts the Supervisor when messages are received from a physical device.

Since each i/o channel requires a queue, this module is preferably written once and used unmodified among the different types of i/o channels 90.

DISPATCH LAYER

The Dispatch Layer 106 of the Communication Interface Software 100 is a state machine that is responsible for controlling the transmission and reception of messages to and from the I/O Channel 50. The Dispatch Layer 106 is event driven by a timer of the Supervisor processor. As such it drives the I/O Channel 50 through various states so that the time is not lost waiting for the I/O Channel 50 to respond to requests. It also responds to errors detected by the Dynamic Link Protocol Layer 108 and issues acknowledgments and retransmissions where appropriate.

Because Dispatch Layer 106 must be knowledgeable of the different states required for communication on each channel, there is a unique dispatch class for each type of channel (serial, Multibus, GSC, etc.). However, as there are similarities between different dispatchers, code can be shared as appropriate.

DYNAMIC LINK PROTOCOL LAYER

Dynamic Link Protocol Layer 108 provides integrity of the data being transmitted on the channel by taking information out of the Network Layer 110 and converting it to a generic format. Some channels may not require a very robust Dynamic Link Protocol Layer. Since this layer will change significantly with each type of I/O channel, it is described in greater detail in the paragraphs that follow which describe the individual I/O channels in detail.

NETWORK LAYER

The Network Layer 110 provides the actual access methods to the i/o channel hardware or software driver. This layer is responsible for direct input/output with the physical i/o channels 90. As such, it provides all of the set up and initialization required for the i/o channel, and all handshaking to and from the physical device connected to the i/o channel. The Network Layer 110 also provides the lowest level of read, write and status access to the i/o channel.

The Application Interface Layer 102 and the Queue Layer 104 are the same for every type of i/o channel 90. The Dispatch Layer 106, Dynamic Link Protocol Layer 108 and Network Layer 110 vary based on the i/o channel type, i.e., the behavioral differences of each i/o channel type are taken into account in these three layers.

COMMUNICATION MESSAGES

Each message sent to or received from an I/O channel has a specific or nonspecific message ID associated with it. This message ID is contained in the header of the message and any response that the receiving station generates must contain this message ID. In this way, unsolicited messages are distinguished from normal response messages by the message ID contained in the message.

Messages passed to an I/O channel by the Supervisor are assigned a unique message ID by the communication interface code. The message ID is returned by the communication interface to the calling procedure. All subsequent attempts to solicit status or read a reply message to the originally transmitted message must make use of this unique message ID. These reply messages are referred to here as solicited messages, simply because they are generated as a response to a request.

A second type of message received by the Supervisor is referred to here as an unsolicited message. Unsolicited messages are messages that a device needs to send at a particular moment, regardless of the fact that it was not asked to do so by the Supervisor. Not all i/o channels 90 support unsolicited message traffic, and not all devices connected to i/o channels 90 need to send unsolicited messages.

A polled device is an example of a physical device that does not support unsolicited messages. In this instance, it is the responsibility of the Communication Interface Software 100 to propagate the message ID when responding to a message so that the response message is not mistaken for an unsolicited message.

When a physical device, such as stitcher module 72, is required to send an unsolicited message to the Supervisor, it is the responsibility of the device controller (firmware) associated with this physical device to generate a nonspecific message ID (in the preferred embodiment this is always 0). The Supervisor is notified upon reception of such a message by the Communication Interface Software 100 in a manner identical to the reception of normal response messages, except for the difference in the type of message ID.

DESCRIPTION OF FLOW

Referring now to FIG. 2, a description of the communication flow is described for stitcher module 72. Typically, the Supervisor software communicates with the Communication Interface Software 100 in the following steps. The Supervisor application software in Station 34 calls the write method of the Application Interface Layer 102 of the Communication Interface Software 100, passing it a message to be delivered to the physical device 72 attached to the GSC i/o channel 90. The Communication Interface Software 100 posts a message to the event queue if it is unable to successfully transmit the message. If the message transmitted generates a response, the Communication Interface Software 100 will post a message to an event queue in Queue Layer 104. When a message is received by the Communication Interface Software 100, the message is placed onto the queue until it can be processed by the Dispatch Layer 106.

The processing flow within the Communication Interface Software 100 can be thought of as taking place in four stages an initialization stage, an application stage, a dispatch stage and a destruction stage.

The initialization stage is responsible for configuring the I/O Channel 50 based upon the parameters passed to it from the Supervisor. It is possible to call this stage whenever it is necessary to change the configuration of an I/O channel.

The application stage occurs when the Supervisor software communicates with the Communication Interface Software 100 for the purposes of reading, writing or requesting the status of a message. The application stage flow takes place through the Application Interface Layer 102.

During the application stage flow, messages are received by the Application Interface Layer 102. These messages are then passed to the Dynamic Link Protocol Layer 108 so that any required formatting can be performed. The possibly converted packet is then placed on the application queue in Queue Layer 104 until such time as the Dispatch Layer 106 fetches the packet to be transmitted.

When station 34 receives a message informing it that a message is available for it on either of the I/O Channel 50 message queue's (response or unsolicited), the station 34 calls the read method in the Application Interface Layer 102 of the Communication Interface Software 100. At this point, the message is removed from the queue in Queue Layer 104 and is returned to the calling station 34.

The dispatch stage flow takes place during a timer service routine and represents the flow of processing in a state machine that directs traffic and handshaking between the Supervisor application and the physical device 72 coupled to the I/O Channel 50.

During the dispatch stage flow messages are transmitted on the I/O Channel 50 in the following manner. The Message Dispatcher 30 looks for messages on the application queue in Queue Layer 104 that have not already been sent (or have not been completely sent). Should one be present, the Dispatch Layer 106 marks this message as active and begins transmission of the message (or continues transmission of the message) through the Network Layer 110.

Once this message has been transmitted it's status changes to pending indicating that an acknowledgment is expected. At this point, the message state can change to indicate successful transmission (if an acknowledgment is received) or to indicate an error condition (if any error condition is reported on the I/O channel or the message is not acknowledged). In the case of an error condition, the Message Dispatcher 30 may resend the message a predetermined number of times before reporting the error to the Supervisor.

A message remains on the Application Queue in Queue Layer 104 until the Message Dispatcher 30 determines it's final disposition. In the case of an error condition, the Message Dispatcher 30 reports this error to the Supervisor via a message to the event queue in Queue Layer 106.

During the dispatch stage flow, messages are received from the i/o channel 90 as follows. The Network Layer 110 is polled for the presence of data. If data is present, the entire message is collected from the Network Layer and temporarily buffered by the Message Dispatcher 30. This process may involve multiple state transitions in order to collect a lengthy message.

Once the Message Dispatcher 30 receives the entire message, it makes use of the Dynamic Link Protocol Layer 108 to decode the message. If the Dynamic Link Protocol Layer 108 indicates that the message has been corrupted, the message is "NAKed" (negative acknowledgment) and discarded.

If the message has been received with out errors, the Message Dispatcher 30 passes the decoded message to the appropriate queue and posts a message to the event queue for the station 34 associated with the i/o channel 90 informing station 34 that a message is pending for it.

During the destruction stage, the Communication Interface Software 100 will flush all of its queues. Once this is complete, any handshaking required to shut down the communication link is performed. Lastly, any buffering that may be present on the physical communication devices is also flushed.

SERIAL INTERFACE

The serial interface provides a high speed (preferably 38 kb), bi-directional, peer to peer message path between the Supervisor and a controller for a serial device, such as scanner 70. Either the Supervisor or the controller can initiate a message transfer without concern of data collision since the data path operates fully in both directions.

The Dynamic Link Protocol Layer 108 provides integrity of the data being transmitted on the channel. For the serial channel, the Dynamic Link Protocol Layer 108 converts outgoing messages to redefined structured packets, generates a 16 bit CRC code for error detection, and converts inbound packets back to messages.

The serial channel protocol is not be aware of the nature of the data it is asked to transfer. That is, the data passed to the Dynamic Link Protocol Layer 108 for transfer is treated as transparent binary data and may contain the full range of binary numbers (0–255) that may be represented by a single byte. The Dynamic Link Protocol Layer 108 performs, for the purposes of reliability, a two byte substitution on any byte in the binary data supplied to it that conflicts with the redefined values for protocol header characters, trailer characters, or response characters. When data is received over the communication line by the Dynamic Link Protocol Layer 108, the process is reversed and the binary data is restored to it's original form. This process, along with the protocol description itself, is discussed in greater detail below.

The protocol is capable of operating bidirectionally across the communication link, with data traveling simultaneously in both directions. This is possible because, as described above, all control characters are unique and not found within the data "packets".

Since the Dynamic Link Protocol Layer 108 is unaware of the nature of the data passed to it, the protocol is immune to any future changes in the Application Interface Layer 102 communications protocol. Therefore, the protocol is capable of connecting the Supervisor to any number of devices (scanners, printers, etc.) as well as being well suited to any number of future projects. The design goal of the protocol is to provide maximum flexibility, and thereby reusability, for the future.

In the preferred embodiment of the present invention the protocol is loosely based upon an original XMODEM specification developed by Ward Christensen as well as the YMODEM specification developed by Chuck Forsberg.[1] Both XMODEM and YMODEM have survived the test of time and provided themselves to be both flexible and fairly reliable asynchronous protocols. However, since both XMODEM and YMODEM require fixed length packets and 8 bit transparency with no predefined control codes, the protocol defined herein also loosely borrows from the ZMODEM specification developed by Chuck Forsberg.[2]

[1]XMODEM/YMODEM PROTOCOL REFERENCE, A compendium of documents describing the XMODEM AND YMODEM File Transfer Protocols. Edited by Chuck Forsberg, Omen Technology Inc., Oregon, 1987.

[2]The ZMODEM Inter Application File Transfer Protocol. Chuck Forsberg, Omen technology Inc., Oregon, 1987.

HIGH LEVEL PROTOCOL STRUCTURE

When discussing the high level structure of the protocol it is necessary to understand two concepts, packetization and acknowledgment. A packet is a structure containing a packet header, the original user data (possibly in a modified form), and a packet trailer. The overall structure of the packet is described in greater detail below. For now, it is only important to understand that user data is transmitted and received in packets.

A acknowledgment is a much shorter structure that is normally sent as a response to a packet. There are two types of acknowledgments that may be sent in response to a packet a negative response and a positive response.

A negative acknowledgment, referred to herein as NAK, informs the sender that there was a problem receiving the packet, and that the sender should retransmit the packet. A positive acknowledgment, referred to herein as ACK, informs the sender that the packet was properly received, and that the sender may now send additional packets to the receiver.

The high level relationship between the two acknowledgment codes (NAK and ACK) and the packet is as follows. In general, when a sender transmits a first packet (packet1) and packet1 is successfully received, an acknowledgment signal (ACK) is returned by the receiver before a second packet (packet2) is sent by the sender.

Not all packets will be received error free. When a received packet contains errors, the receiving station requests a retransmission of the packet by returning a not acknowledged (NAK) signal to the sender. The sender then resends the packet that was received unsuccessfully. In the preferred embodiment of the present invention, no packet is resent more than nine times. After ten (10) unsuccessful attempts at sending a particular packet, the protocol reports a data link error back to the application program. Acknowledgment characters cannot appear within a packet. Therefore, transfer of packets and acknowledgments can proceed bidirectionally on the communication line.

It is possible for line noise to corrupt an acknowledgment code as well as a packet. In this instance, the sender either does not receive a response to the transmission, or the response does not consist of any recognizable acknowledgment characters. The proper action for the sender to take in this instance is to resend the transmission. If a second instance of a previously "ACKed" packet is received, it should also be "ACKed". When a transmitted packet receives no acknowledgment after a period of at least a predetermined time $T_0$, it should be retransmitted as if it were "NAKed".

In the preferred embodiment of the present invention, packets contain a sequence number to insure that the sender and receiver remain in synchronization throughout their communication.

PACKET STRUCTURE

Figure 4:
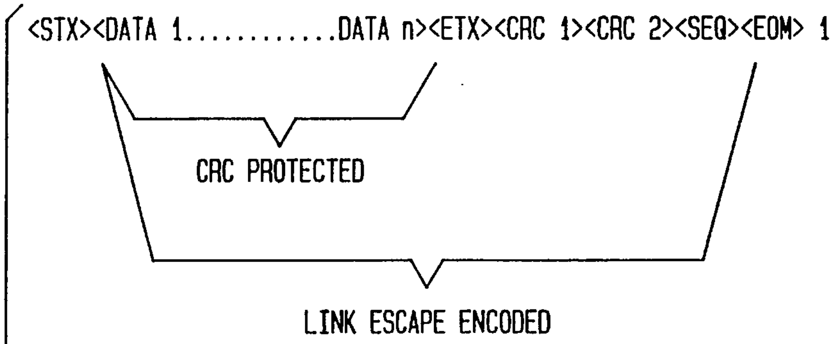
FIG. 4 is a format of a typical message packet communicated in accordance with the present invention.

In the preferred embodiment, binary data of up to 120 bytes are "packetized" by the protocol prior to transmission. The actual process by which this data is converted to a packet is detailed in the next section, however, the format of a typical packet is represented in FIG. 4.

Figure 5:
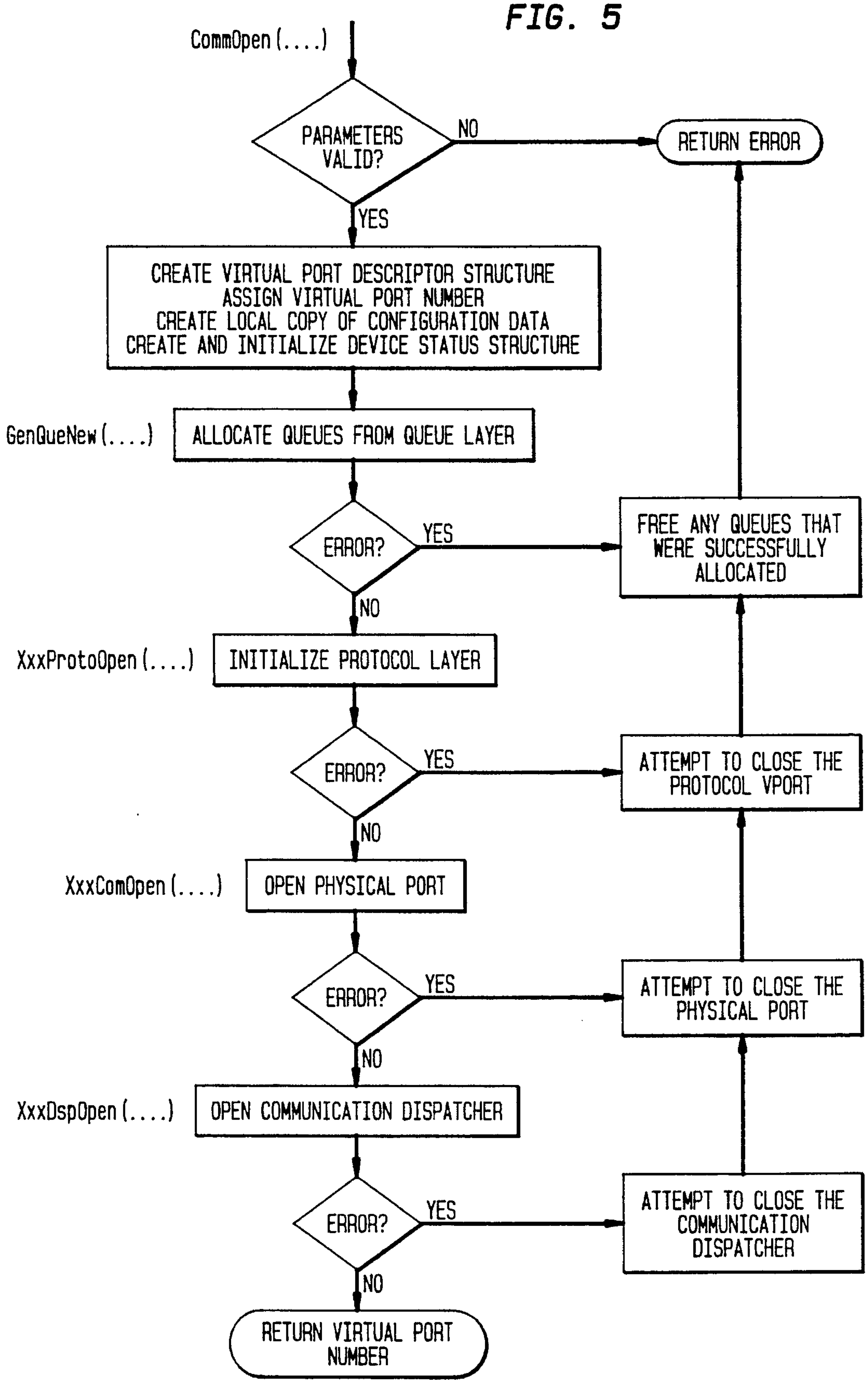
FIG. 5 is flow chart for the initialization of virtual stations and I/O channels of the present invention.

Referring now to FIG. 5, the Supervisor software initializes communication between the Stations and I/O Channel 50.

In the preferred embodiment of the present invention, there are four types of i/o channels 90: multibus, simple serial layer, serial layer (protocolized), and GSC Layer. It will be understood that the present invention has the flexibility to handle any other type of physical connection for communication.

A significant advantage of the present invention over the prior multibus system is that conventional diagnostic tools can be used to debug the system without stopping the inserter system. Heretofore, breakpoints were used as a manual interactive debugging tool for the prior multibus system. Such use of breakpoints required that the inserter system be stopped to monitor messages sent to and received from the firmware. The present invention also provides a debugging tool for the non repetitive occasional problems that may exist on the inserter system.

In accordance with the present invention, the Message Dispatcher maintains a list of addresses (message procedures) that identify destinations for messages. This is beneficial for diagnostics and is key to the present invention. A message procedure is analogous to a mail stop or P.O. box, with a station being a home and the Message Dispatcher being a mailman. The originator of the message sends a message structure to the Message Dispatcher and the receiver receives a message procedure.

The present invention provides several benefits over existing system software architecture. One benefit of the open station architecture of the present invention is that it provides supervisor software that does not change with changes to any of the physical modules or types of I/O channels configured in the inserter system. The software for real time control 20, application (stations) 32–44, application interface layer 102 and Queue Layer 104 of I/O Channel 50 are independent of the physical i/o channels 90 and physical modules 70–82.

Another benefit is that the present invention does not have the limitations found in the conventional distributed processing software architecture. The open station architecture 10 is suitable for faster machine proccessing and larger inserting systems. Still another benefit of the present invention is different types of physical devices, i.e. devices connected to different physical I/O channels, can communicate to each other through the open station architecture of the present invention. Thus, GSC stitcher feeder module 72 can communicate with serial feeder 76 through I/O Channel 50 and Station 34. In the preferred embodiment of the present invention, GSC stitcher feeder 72 and serial feeder 76 are associated with the same application software, i.e. Station 34, because both physical modules perform feeding functions.

While the present invention has been disclosed and described with reference to a single embodiment thereof, it will be apparent that variations and modifications may be made therein. It is, thus, intended that the following claims cover each variation and modification that falls within the true spirit and scope of the present invention.

What is claimed is:

1. A software architecture system for real-time control of an inserting system having a central processor coupled to a plurality of distributed processors that are associated with physical modules of the inserting system, the central processor being coupled to the distributed processors by at least one type of physical I/O channel, comprising:

real-time control routines resident in the central processor;

a plurality of virtual stations resident in the central processor, each of said virtual stations corresponding to one of the physical modules of the inserting system;

at least one virtual I/O channel corresponding to each type of the physical I/O channel, said virtual I/O channel being resident in the central processor and operatively coupled to the physical I/O channel; and means resident in said central processor for dispatching messages from said virtual stations to the corresponding physical modules through said virtual I/O channel; wherein said virtual I/O channel includes a multi-layered communication interface between the physical modules and said virtual stations, said multi-layered communication interface including an application interface layer, a queue layer, a dispatch layer, a dynamic link protocol layer, and a physical network layer, wherein said application interface layer interfaces directly with said virtual stations and said physical network layer interfaces directly with the physical I/O channels.

2. The system of claim 1 wherein said dispatching means dispatches messages from said physical modules to corresponding ones of said virtual stations.

3. The system of claim 1 wherein each of said virtual stations is independent of the type of physical I/O channel connected the corresponding physical modules.

4. The system of claim 1, further comprising a user interface operatively coupled to said virtual I/O channel for communication to said virtual stations and the physical modules.

5. The system of claim 1 wherein the plurality of physical modules connected to a plurality of physical I/O channel types communicate among themselves through said virtual stations and said virtual I/O channels.

* * * * *